March 24, 1942.   L. TREML   2,277,535
SPRING DRIVEN TYPEPRINTING TELEGRAPH APPARATUS
Filed Sept. 7, 1939   15 Sheets-Sheet 1

March 24, 1942. L. TREML 2,277,535
SPRING DRIVEN TYPEPRINTING TELEGRAPH APPARATUS
Filed Sept. 7, 1939 15 Sheets-Sheet 3

Inventor:
L. Treml
By E. F. Wendroth
Atty

March 24, 1942. L. TREML 2,277,535
SPRING DRIVEN TYPEPRINTING TELEGRAPH APPARATUS
Filed Sept. 7, 1939 15 Sheets-Sheet 4

Inventor:
L. Treml
By E. F. Wendroth
Atty

March 24, 1942.   L. TREML   2,277,535
SPRING DRIVEN TYPEPRINTING TELEGRAPH APPARATUS
Filed Sept. 7, 1939   15 Sheets-Sheet 5

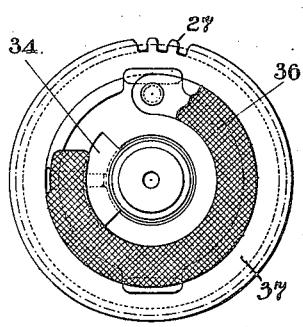
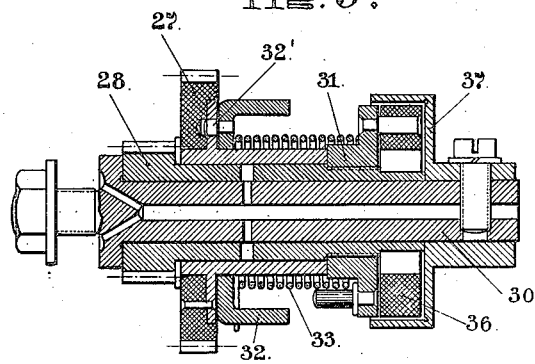
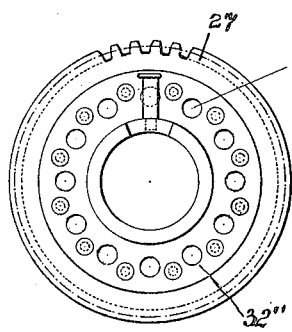
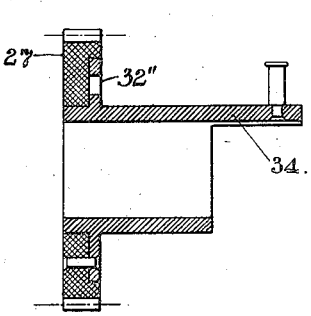
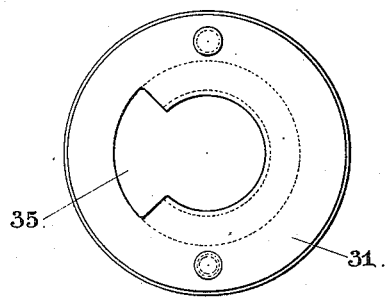
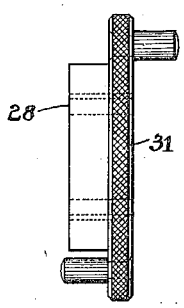

March 24, 1942.   L. TREML   2,277,535
SPRING DRIVEN TYPEPRINTING TELEGRAPH APPARATUS
Filed Sept. 7, 1939   15 Sheets-Sheet 7

Inventor:
L. Treml
By E. F. Wenderoth
Atty.

March 24, 1942. L. TREML 2,277,535
SPRING DRIVEN TYPEPRINTING TELEGRAPH APPARATUS
Filed Sept. 7, 1939 15 Sheets-Sheet 8

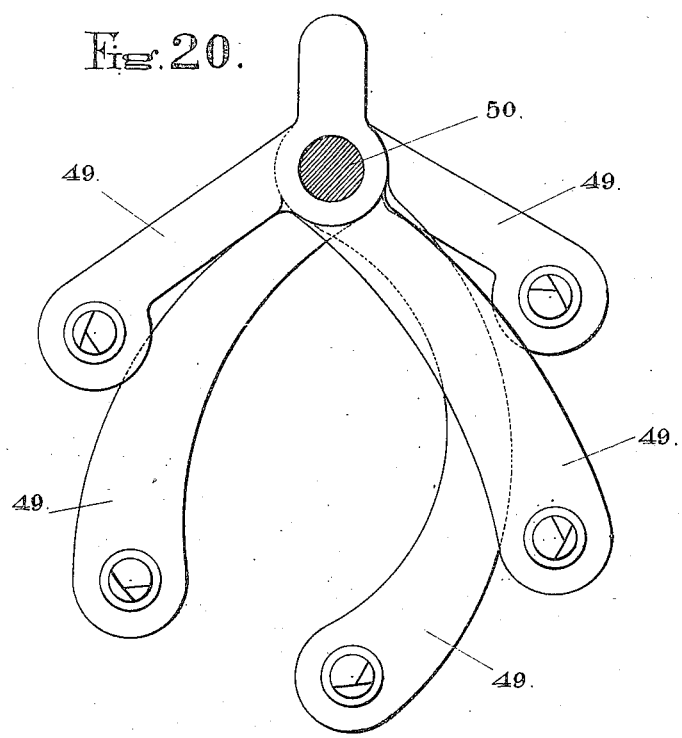
Fig. 20.
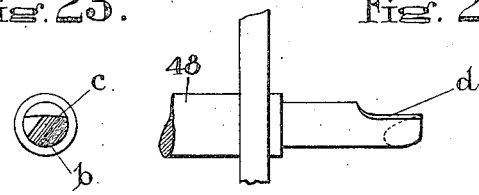
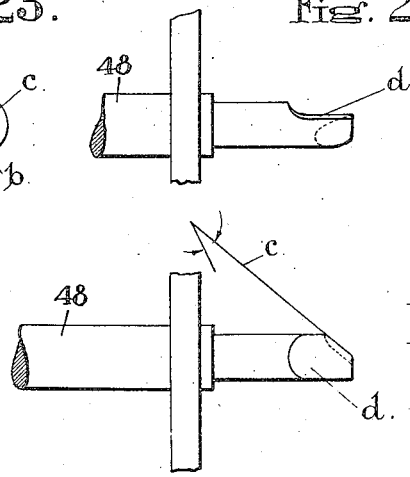
Fig. 23. Fig. 21. Fig. 22.
Inventor:
L. Treml
By E. F. Wendroth
Atty March 24, 1942.   L. TREML   2,277,535
SPRING DRIVEN TYPEPRINTING TELEGRAPH APPARATUS
Filed Sept. 7, 1939   15 Sheets-Sheet 10
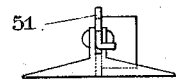
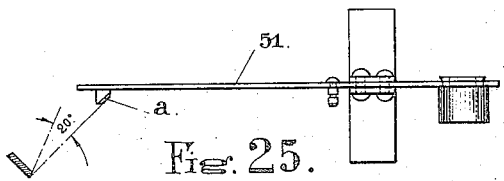
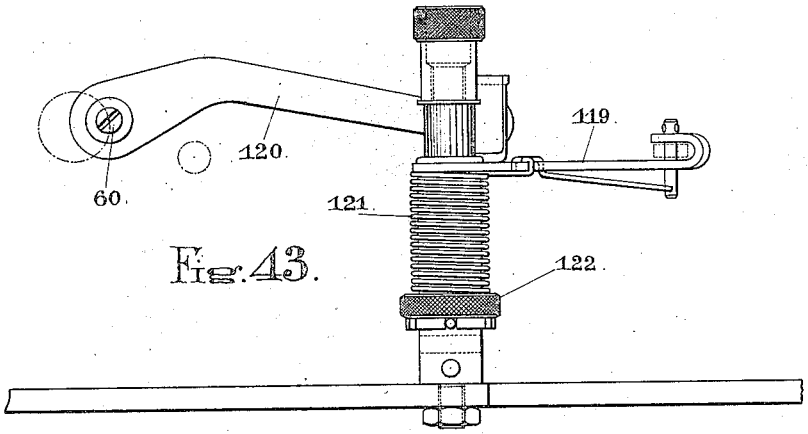
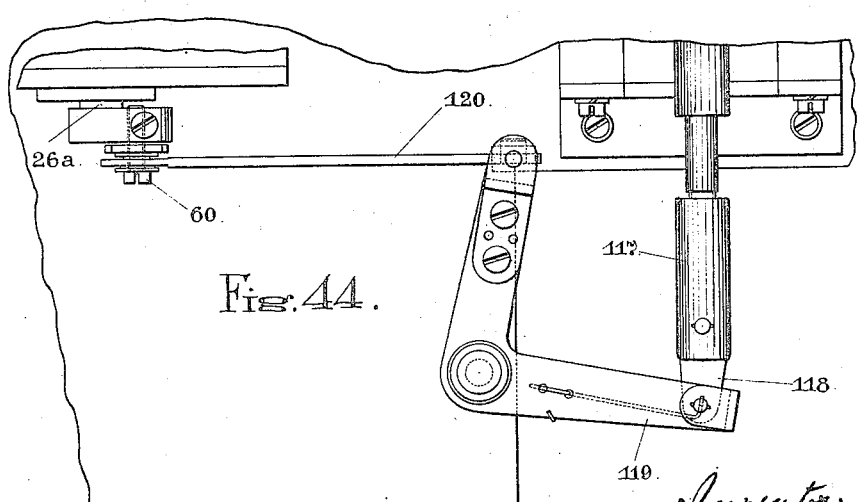

March 24, 1942.  L. TREML  2,277,535
SPRING DRIVEN TYPEPRINTING TELEGRAPH APPARATUS
Filed Sept. 7, 1939  15 Sheets-Sheet 11

Inventor:
L. Treml
By E. F. Wenderoth
Atty

March 24, 1942.                L. TREML                 2,277,535
           SPRING DRIVEN TYPEPRINTING TELEGRAPH APPARATUS
               Filed Sept. 7, 1939        15 Sheets-Sheet 12

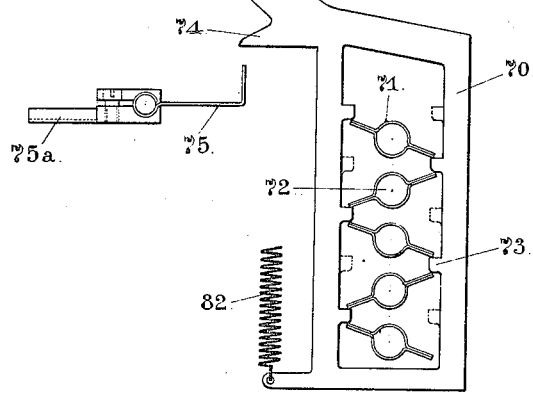
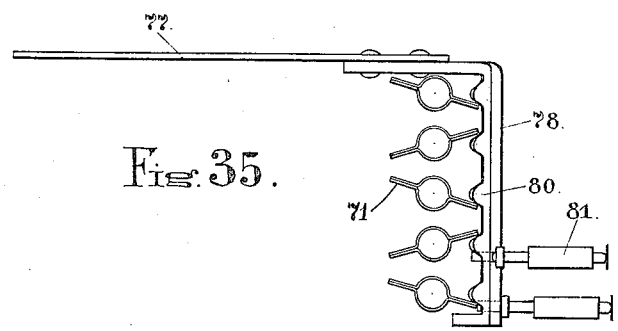
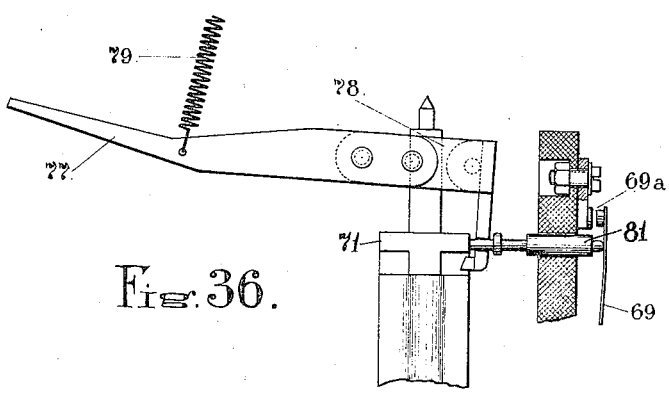

Patented Mar. 24, 1942

2,277,535

UNITED STATES PATENT OFFICE 2,277,535

SPRING DRIVEN TYPE-PRINTING TELE-
GRAPH APPARATUS

Leonid Treml, Moscow, Union of Soviet Socialist
Republics

Application September 7, 1939, Serial No. 293,826
In Union of Soviet Socialist Republics July 26,
1939

8 Claims. (Cl. 178—81)

The state of the art

Up to the present time numerous attempts have been made to construct a telegraphic type-printing apparatus that could be driven by spring or gravity motors wound up by hand or foot. This has hitherto been impossible because the transmitting, receiving and printing devices of all existing start-stop apparatus required the application of considerable power for their operation, since, during one cycle, all parts have to instantaneously acquire the necessary constant speed and just as instantaneously to come to a stop after the cycle is completed.

In all such known start-stop apparatus, the driving mechanism is in constant rotation, the working parts being coupled to the driver at the necessary moment. Hence it is necessary to apply considerable acceleration to the operating devices to bring them instantaneously to the necessary speed. This obviously requires the expenditure of considerable energy and explains the reason for the large amount of power required.

The Siemen's system (the pendulum-telegraph) is an attempt to make use of a spring to drive the apparatus, the spring being rewound by a motor after every cycle of operations.

A pendulum is used for the purpose of preserving the necessary synchronism of operation of that apparatus. As a result the curve of speed-time relation has a sinusoidal form so that either the transmitting or the receiving commutator have to be unevenly divided to correspond to this curve, and the first and last divisions on such commutator have to be so narrow, that with the available synchronization between two apparatus. it is very difficult to locate the selecting device between these limits.

The principle of synchronization using the period of oscillation of a pendulum necessitates the application of a very light load to the transmitting and receiving devices. At the most, this load could be of the form of lightly moving contact brushes, the application of any mechanical load, such as exist in the receiving devices of other apparatus, being excluded. Consequently, all the operations are performed by electromagnetic devices and not by kinematically coupled mechanisms. The operation of the electromagnets is effected by a local battery, the use of which does not permit the pendulum Teletype telegraph apparatus to be adapted for subscriber's installations.

All other start-stop known telegraph apparatus require that the driving mechanisms be in constant rotation ever when the apparatus is not sending or receiving signals, and that the receiving and transmitting devices suddenly acquire the necessary uniform rotation, demands the expenditure of power much above the ability of an operator to supply, without his having to interrupt his operations for a considerable time.

Objects of the invention

An object of my invention, therefore, is to produce a thoroughly practical, reliable and simple kinematic apparatus, energizable either electrically or mechanically, formed as a single unit, and having only a minimum power requirement, and demanding but a small amount of line current, which apparatus has a single actuating means and a single speed regulator, the said unit being adapted to transmit and receive telegraphic impulses in discontinuous manner in working cycles, for actuating type-printing through kinematically coupled mechanism, in the substantial absence of inertia, all with a high degree of certainty, accuracy and rapidity of operation, and in which apparatus the operating speed can be maintained substantially constant within narrow limits during the working periods of each cycle, with no energy being consumed during the rest periods of said working cycles.

Another object is to produce a start-stop telegraphic apparatus adapted to limit and maintain substantially constant the amount of power required, and which will operate at low current demand even when high leakage transmission circuits are employed.

Another object is to produce such an apparatus, having a keyboard, in which but one key at a time can be actuated, in which extremely sensitive code-combination, impulse sensing mechanism is employed, and which a new and improved speed regulator is provided, all with minimum requirement of power for operating the same.

Other objects and advantages will in part be developed hereinafter, and in part will be obvious.

Thus, in order to build a practical apparatus using a spring or gravity motor, easily wound-up by hand, utilising the normal start-stop cycle of operations and able to work in one circuit with motor-driven apparatus, it was necessary to design a speed regulator having practically no inertia. It was necessary furthermore that this regulator should keep the speed of rotation of the operating parts after they had instantaneously acquired the prescribed speed, constant within very close limits during the whole operating cycle and, after the termination of this cycle would not have any inertia that would prevent the moving parts from stopping immediately.

Furthermore, to avoid the necessity of having two separate driving springs and two speed regulators, for the receiving and transmitting devices, which, in existing start-stop telegraph apparatus, operate at different speeds, the receiving and transmitting devices had to be combined together into one mechanical unit driven by one spring and having one speed regulator and at the same time arrange the operating cycle of the transmitting and receiving devices in complete conformity as regards speed of impulse transmission with those of the usual start-stop apparatus in which the receiver and transmitter rotate at different speeds. This gives the added advantage that only one speed governor is required.

To reduce the power used by the apparatus, so that it could be wound-up by hand, it was necessary to arrange the operating cycle so that in the intervals between the transmission of signals, the apparatus consumed no energy.

An apparatus fulfilling the above requirements is illustrated in the attached drawings, in which:

Figs. 1, 2 and 3 give a general view of the apparatus from the top, front and rear, respectively;

Figs. 9-10, 11-12 and 13-14 show one of the parts of the mechanism in section and side views, assembled and taken apart;

Figs. 18, 19, 20 show the selector drum and its parts;

Figs. 21, 22, 23 show the form of the ends of the selector pins;

Figs. 24, 25, 26 show the armature lever of the electromagnet;

Figs. 34, 35, 36 show the action of the keys when transmitting a signal;

Figs. 43, 44 show a part of the decoding mechanism;

*General discussion of present invention*

Figure 1:
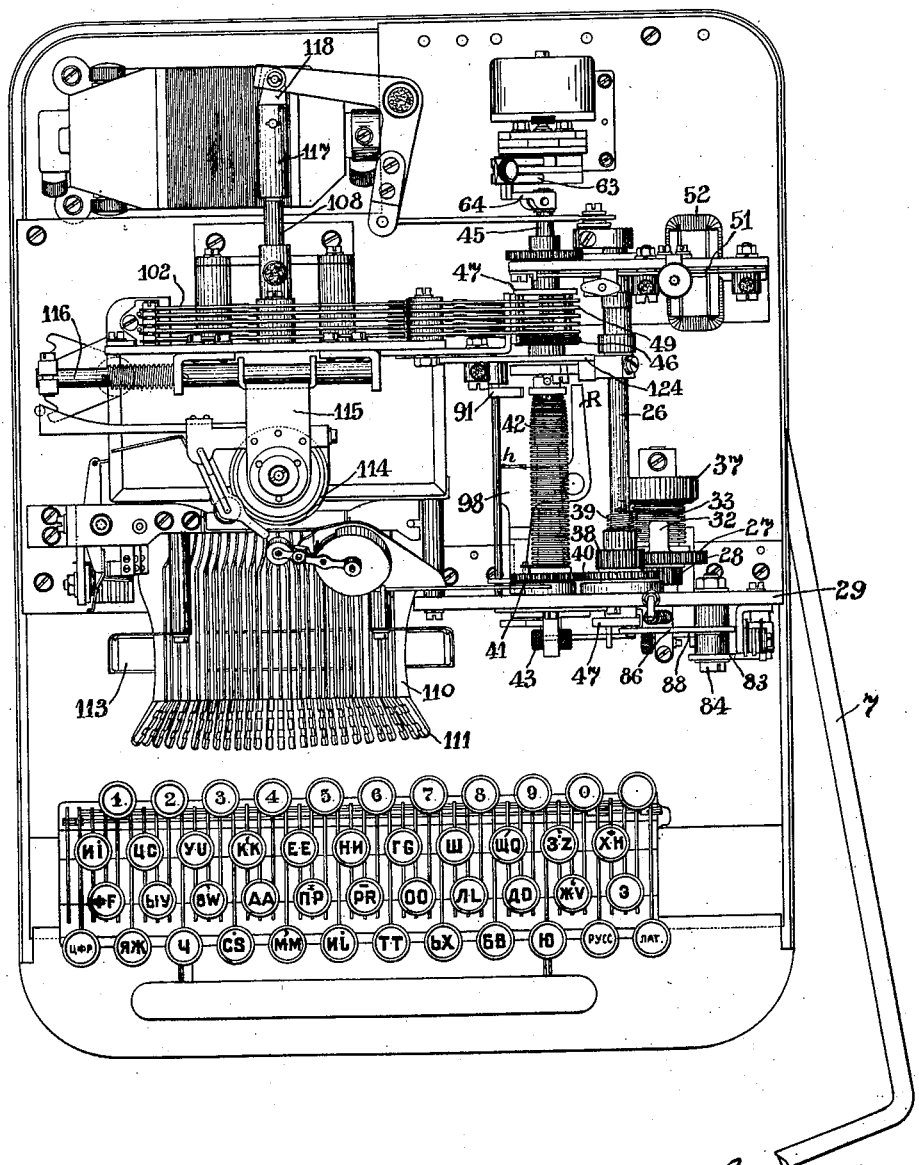
Figure 2:
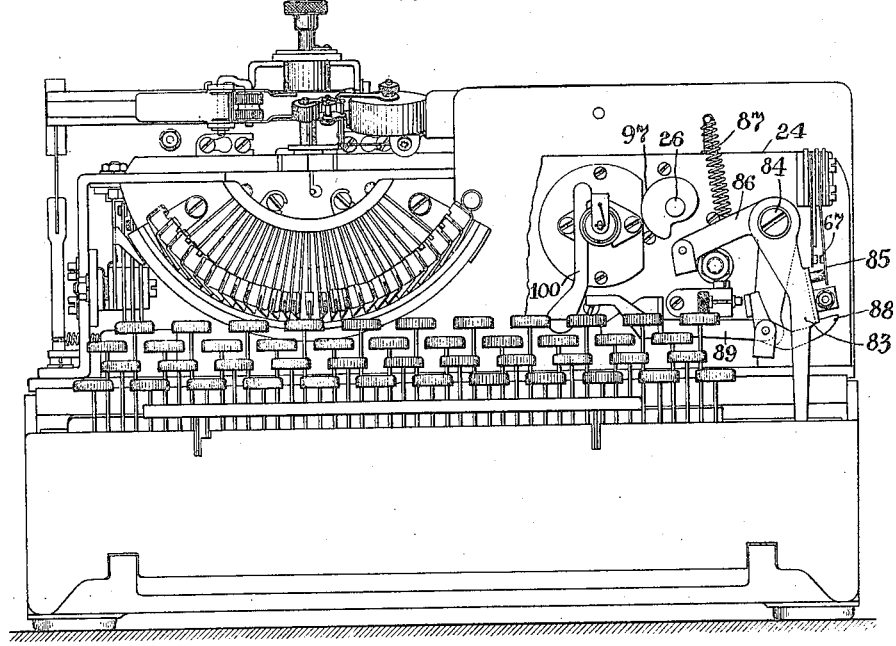
Figure 3:
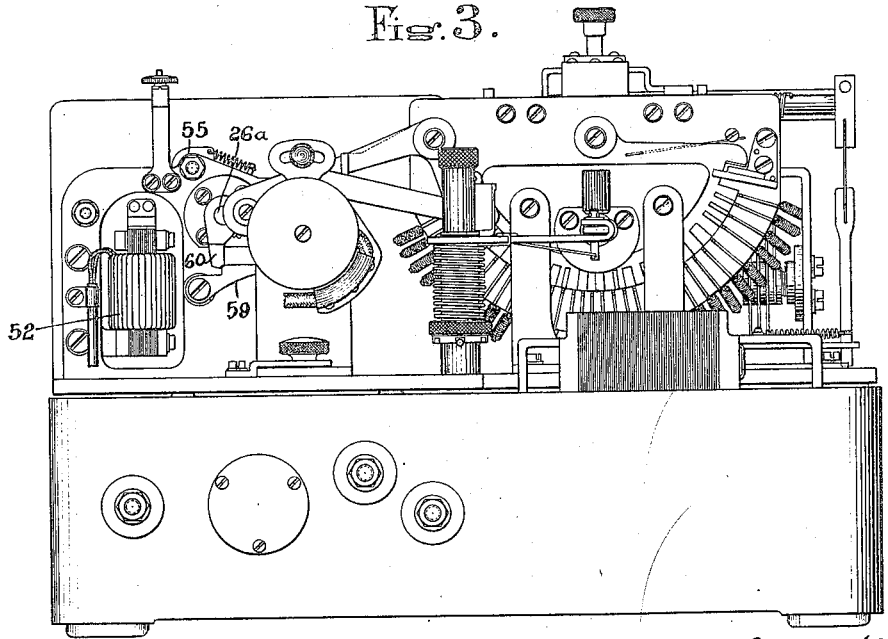

It will be interesting at this time to consider generally exactly what the present invention has as its object and wherein it constitutes an improvement over the prior art.

It is well recognized that the start-stop cycle of operation of a printing apparatus operating on a code is much superior to and differs basically from those transmitting and printing apparatus which operate on a stepwise or unequal code. Printing apparatus functioning on stepwise code are comparatively slow, have restricted working area, and require a local source of electrical energy for operating the mechanism of the printing apparatus. On the other hand, the start-stop type of printing apparatus, toward which the present invention is directed, has a much faster operation, a wider scope of utility, and in other ways is vastly superior to the stepwise code apparatus referred to.

Nevertheless, the known start-stop apparatus possesses certain fundamental defects, toward the elimination of which my present invention is directed. By start-stop apparatus, I mean apparatus in which the various transmitting and receiving mechanisms are almost instantaneously brought from a rest position to a constant operating speed, and are then restored almost instantaneously to their initial or rest position.

Because of the size and weight of the several parts of the constructions hitherto available for start-stop operation, these devices have had uniformly to be of considerable size and weight, and the inertia effects attendant upon loading and unloading and consequent expenditure of power are so great that, just as in the case of the stepwise code apparatus previously referred to, a local source of energy had to be provided for energizing the apparatus.

More specifically, those start-stop apparatus conventionally consist of a spring motor drive, the spring of which is intermittently rewound from an electrical motor. Wattages of from 30 to 60 watts are normally required for such systems. Thus these known start-stop apparatus are not designed for use on small or remote lines, or what is known as subscriber's lines.

A basic object of my invention, therefore, is to produce a start-stop apparatus which is designed so that it can operate at substantially the same speed as the known electrically-rewound start-stop apparatus, but which can be operated satisfactorily with a manually rewound spring motor, which spring motor can be quickly rewound without appreciable effort. As illustrative of my accomplishment of this objective, I may say that to rewind completely the motor according to the embodiment which I will describe hereinafter, the energy required, when converted into terms of electrical units, is only about 3 watts for complete rewinding, or about 1.5 watts for rewinding to the extent that such winding takes place in the ordinary use of my new apparatus.

Prior to my present invention the workers in the art considered it impossible to decrease the power demands of start-stop apparatus to an extent making it possible to employ manual rewind. This belief may be explained in part due to the fact that apparatus known hitherto, and not requiring a local source of electrical energy for moving the mechanical parts, invariably employed receivers constituted of several separate sets of mechanism, each set of mechanism comprising a number of details corresponding to the number of impulses transmitted thereto. However, for proper operation, each of these details had to be brought separately into action in order to transform the combination which was transmitted to and received by the receiver in step by step fashion to form a single combination code character, which character, after being accommodated in and set up by the receiver, is transmitted at a single impulse to a decoding device.

All these operations necessarily required a supply of power which could not be provided from a manually rewound spring motor.

By my present invention, however, both the receiver and the transmitter which heretofore have operated at different rotational speed, are rigidly mounted on a common axle or shaft. Accordingly, the receiver and transmitter have the same speed and are provided with a start-stop device which is common to them both. This is to be contrasted with start-stop apparatus wherein the receiver and transmitter, although attached to a common axle or shaft, operate separately, in succession, and are controlled by separate start-stop devices. In such apparatus the transmitter once it is started, thereafter starts the receiver. The rotational speed of such receiver generally is in excess of that of the transmitter.

In my new telegraph apparatus the transmitting-receiving device forms one mechanically complete unit operated at constant speed during the entire operating cycle, on a multi-signal code of any number of impulses, say five for example. A spring consisting of a number of tandem-connected units is adapted to be rewound manually, brake means being provided for functioning automatically to prevent over-winding. This spring is connected by a torque-limiting device to a second spring consisting of a large number of turns. This second spring rotates the transmitting and receiving device at a fixed speed determined by a pendulum type of escapement, and the operational period or frequency of which is fixed by the spring tension, and which may be adjusted as to natural frequency by an adjustable weight thereon. After each operational cycle the auxiliary spring is rewound from the main spring by a mechanism which will be described hereinafter. Because of this construction it is possible to rewind the manual spring manually during operation of the receiving device.

I of course provide for the use of an electrical rewinder in those cases where a source of electrical energy is readily available. In such case the electrical rewinder is employed instead of the manual rewind previously described.

The selector drum which I employ, and which forms part of the receiving apparatus, is distinguished from the previous receivers described hereinbefore and which consist of several sets of parts in that it has only one set of movable parts, the number of which parts equal the number of impulses in the received code. To illustrate, where a five element code is employed, my selector drum will have five movable parts, which serve to set up the code character during the transmission of five significant impulses received in succession, and after the combination character has been set up, to transmit it in its entirety to a decoder, near the end of the energizing impulse. It is this reduction in the number of movable parts which contributes largely to the reduction of the power requirement to an extent such that manual rewinding becomes feasible. This is contributed to by making it possible to maintain the working parts at rest between the transmission of impulses.

Each character of the code is represented by a key, somewhat similar to a typewriter key, and the arrangement is such that but a single key can be operated at a time.

Reference has been made hereinbefore to the use of a five-element code. When such code is employed, then the operating cycle of my apparatus involves some seven impulses, one of which constitutes a start impulse, followed by five combination or working impulses, the cycle being closed by a single stop impulse. While the first six impulses may be of equal duration, the seventh or stop impulse may be considerably prolonged for reasons which will be developed hereinafter. Additionally, for reasons which will also be developed hereinafter, it is desirable to have the receiving device lag in its operation, the starting impulse, even though these two devices are operated at the same speed from the same shaft. Thus, it becomes necessary properly to correlate the transmitter, which works on from 7 to 7.5 impulses of the seven impulse operating cycle and the receiver, which employs some 6.5 impulses during the same operating cycle. Without special provision, therefore, the transmitter and receiver could not be coupled on a common axle and employed in conjunction with a common start-stop device. However, to that end I make advantageous use of a combination of the electrical and mechanical lag of the receiver back of the transmitter at the beginning of rotation during each operating cycle.

Figure 15:
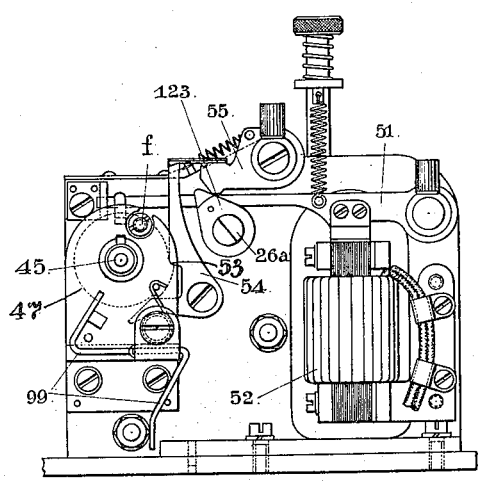
Figs. 15, 16, 17 show the transmitting-sending devices.

To enlarge upon the foregoing, I may say that the rotational speed of the transmitting-receiving device of my new apparatus is substantially that of any of the known start-stop apparatus employing electrical rewind. According to my invention, and as described more fully hereinafter, the starting impulse which brings the transmitter into operation does not begin by a mechanical rotation of the transmitter. Rather, it is occasioned by rupture of the contacts which shunt the device. The time lag involved in the release of the electromagnetic armature described hereinafter with reference to Figure 15 is included in and forms a component part of the time span covering the starting transmission impulse, as will be evident from a consideration of Figure 30. The balance of the transmitting period during which the brush of the transmitter passes over part of the transmitting segment, constitutes the remainder of the transmission time period, and I am enabled to control the duration of this transmitting impulse rather exactly by means which I will point out hereinafter. Here again my construction distinguishes sharply from known apparatus which I have described generally in the foregoing, and has nothing to do with the regulation of the speed and phase-relations of the receiver and transmitter, respectively, of these known apparatus.

In connection with the foregoing discussion it is helpful to add that although the speed of transmission of the transmitter of the transmitting apparatus and of the receiver in the receiving apparatus are somewhat unequal, divergence from synchronism, or asynchronism, appears only after the receiver of the receiving apparatus starts into operation. This is because the receiver and the transmitter are on the same common shaft, and thus have the same rotational speed. Thus the later in the operating cycle that the receiver commences to rotate, the less will be the time remaining before the cycle is completed and the apparatus comes to a stop. Since, however, it is only during that space of time that a difference of phase between the transmitting and receiving devices can occur, it is evident that upon belated operation of the receiver a greater percentage of divergence of speed may be allowed between the transmitter and receiver without distortion in performance.

Another important feature of my invention will be appreciated when it is first considered that were a spring motor to be employed in conjunction with known apparatus wherein the receiving and transmitting parts of interlinked apparatus are driven by gearings of predetermined rotational speed, then a mechanical regulator capable of insuring continuous speed of the driving parts is required, at the waste of considerable power for maintaining the drive in readiness for operating. In my present device, on the contrary, it is only a small part of the receiving and transmitting installation which is required to rotate at a constant speed, so that a comparatively small regulator can be employed which nevertheless exercises sufficient control to satisfy the operational requirements.

I find that a regulator of the anchor-pendulum type, as described hereinafter in connection with Figure 17, and which is driven by the auxiliary spring shown in Figure 8 at a frequency period appreciably greater than its own natural period, can be so reduced in size as to be practically free from inertia, for all practical purposes. In this connection the reader should distinguish my new regulator sharply from an aperiodic anchor-pendulum, which displays a non-rectilinear relation between its frequency and the applied stress.

The use of a single sensitive, low-weight speed regulating device for the starting-receiving mechanism makes it possible for me to drive the entire transmitter-receiver from a low powered spring, giving up its energy only during the transmission of impulses, regulation being restricted to a single part of the entire apparatus.

I find, however, that my use of spring motor requires the installation of a second regulator in the form of a power-limiting means, which is similar to the speed regulator already described, and is characterized by its substantial absence of inertia. Such power limiting regulation is required upon variation in the available power supply. It is apparent that in the absence of some such limiting means possessing regulatory action, this available power decreases as the spring unwinds, and is noticeable in the printing of the various types and in the actuation of the several mechanisms required varied energy inputs. Such variation in the available energy is especially pronounced during the time that the spring is being rewound. In the absence of some practical means such as my power limiting device, parts designed for functioning at the average spring tension would quite likely be damaged or even destroyed at the great stresses existing near the completion of the rewinding operation.

I have stated hereinbefore that a variant of my present invention consists in employing an electrical rewinding device where a source of electrical supply is available. In such case the power regulator or power limiting means which I employ makes possible the provision of a frictional coupling between the electrical motor and the driving shaft of my apparatus without the intermediary of an additional speed regulator. This is because in such case variation of the motor speed will not affect the driving speed or torque transmitted to the several parts of my apparatus. Since as stated hereinbefore my device does not demand a power in excess of 3 watts, the high speed electrical motor which I may employ obviously will be considerable smaller than those hitherto used.

Summarizing briefly before launching into a more detailed description of the several structural parts of my invention, it may be stated that the salient features of this present invention are directed to an apparatus operating on the normal start-stop period without local battery and with manually rewound spring motive power (not more than ten seconds being required to rewind manually the spring after each 500 types printed and the strength required to that end not exceeding that required for rewinding a recorder) and are as follows:

1. A combined transmitter-receiver having a common axle or work shaft and a common start-stop arrangement therefor;

2. Means for rotating the common shaft at a constant speed of rotation during each working cycle, although the spring drive has periodic action.

3. The use of the electrical and mechanical angular lag of the receiver in the creation of the transmitting impulse, this lag being subject to regulation. This makes possible satisfactory and undistorted performance of the interlinked transmitter and receiver although the percentage difference between their operating speeds is higher than has heretofore been the case.

Figure 18:
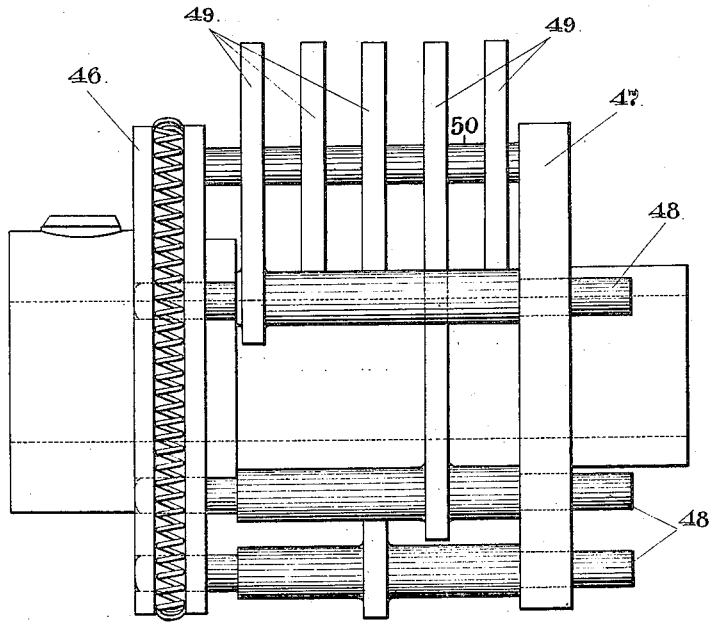
Figure 19:
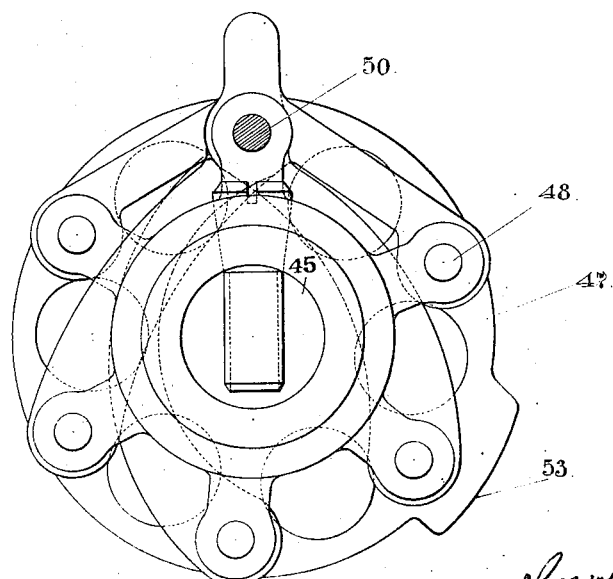
Figure 27:
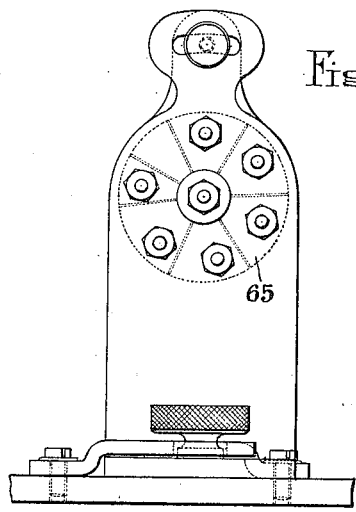
Figs. 27, 28, 29 show the commutator of the transmitting device.
Figure 28:
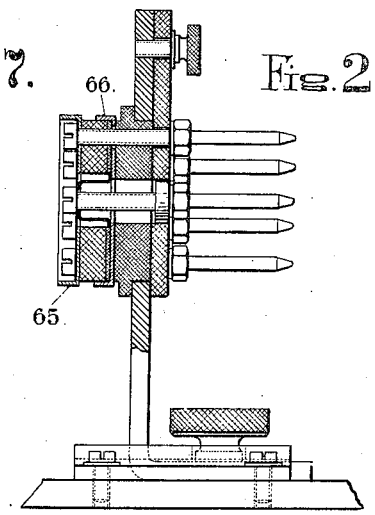
Figure 29:
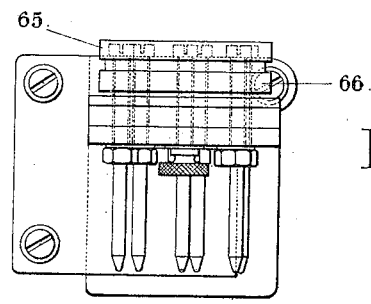

The selector drum shown in Figures 18 through 20 possesses certain features of distinction enabling it to cooperate with the entire apparatus. This selector drum, operable by the auxiliary spring referred to hereinbefore and which develops a power of less than 1.5 watts, has such construction as to possess extremely sharp selectivity. Thus a receiver impulse can be set up and fixed thereon during about only two percent of the duration of the transmitted impulse, so that the selector has a correcting ability of nearly plus or minus 49%.

In accordance with the operating cycle on which my apparatus functions the receiver, coupled to the same shaft on which the transmitter is mounted, must provide 6½ operating divisions during the complete revolution of this shaft through 360 degrees, i. e., from the beginning of the starting transmission or impulse to the middle of the stop transmission or impulse. Since the transmitter and receiver revolve together, the receiver likewise must be divided into 6½ parts, to make possible the control of the entire apparatus. However, it is necessary, as will be described hereinafter, to transmit seven impulses each cycle through the transmitter, the deficiency between the six and one-half and seven impulses referred to residing in the starting and stopping segments such as will be described hereinafter with respect, for example, to Figures 27 through 30. Instead of mechanically adding to the mechanism, however, I employ the angular mechanical lag in the rotation of the receiving device and of the electrical lag in the anchor escapement (Figure 17). It will be seen, therefore, that the starting impulse commences, not upon release of the transmitter, but upon breaking the contacts shunting the same.

The letters are transmitted by depressing keys arranged like the keyboard of a typewriter.

If the apparatus is installed on premises having an electrical supply, the driving spring is wound up by an electric motor which is automatically switched on and off as necessary. When the apparatus is wound up by hand, an automatic brake is actuated shortly before the spring is fully wound so as to prevent damage to it. The same frictional brake prevents the spring from being over-wound should the motor not be switched-off at the proper moment; the extra amount of power required from the motor when the brake is applied is so large, that the motor fuses blow out.

The operating speed of this spring-driven, hand-wound start-stop apparatus is the same as that of the best motor driven apparatus, the speed being fixed by the operation of a special spring driving the transmitting-receiving device. This spring is rewound after every cycle by the main-spring motor.

One complete rewind of the main spring enables it to effect the transmission of 1000 signs.

A device limiting the number of turns the main spring may be unwound has been included in the design. This limiter always leaves the spring wound up sufficiently to ensure the reliable operation of the apparatus no matter in what adverse temperature or other conditions it may be operating. As a result, the main spring can effect the transmission of 600 signs. The limiter gives a warning that the mainspring should be rewound and in case the spring is not rewound it locks the apparatus without disturbing the speed regulation.

The apparatus is furnished with a vibrational speed indicator tuned to the speed of free unretarded rotation of the receiver axle. As a result, the indicator does not respond to the vibrations of neighboring apparatus as is the case with other types of apparatus having vibrational indicators.

Experience has shown that a woman operator of no great muscular power needs from 8 to 11 seconds to wind up the spring sufficiently to transmit 600 signs. As the usual practice is to transmit telegrams in series of 10 alternatively in each direction, only 4-5 seconds are required to fully wind-up the apparatus after a series of 10 telegrams has been transmitted. The spring may be wound up during reception of the other subscriber's series.

Apart from the above, the apparatus possesses a number of other advantages. In construction, it is much simpler than other types and works much more reliably on telegraph lines having large leakage, and it requires comparatively little current for its operation. For instance over a distance of 300 km. of line in which neighboring circuits cause considerable induction, efficient operation with one battery requires a line current of 35-40 m. a.

It is characteristic of the proposed device that during the intervals between the transmission of each sign, the working parts are all at rest and do not use any of the energy stored up in the mainspring.

The key-board of the proposed apparatus is constructed in a manner preventing the depressing of more than one key at a time, all the others being locked, thus permitting smooth, "legato" manipulation of the keys as the fingers need not be lifted off the keys. This smooth operation is impossible of attainment in apparatus having combination strips with slanting teeth on them. Furthermore it affords a guarantee that there will be no distortion of the proper combination of impulses belonging to the sign being transmitted even when the manipulation of the keys is not very even.

*Motor assembly*

Figure 5:
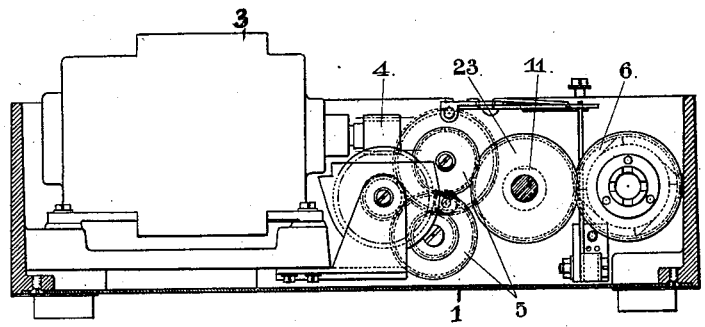
Fig. 5 shows a section of the motor mechanism along line 5—5 of Fig. 4.
Figure 4:
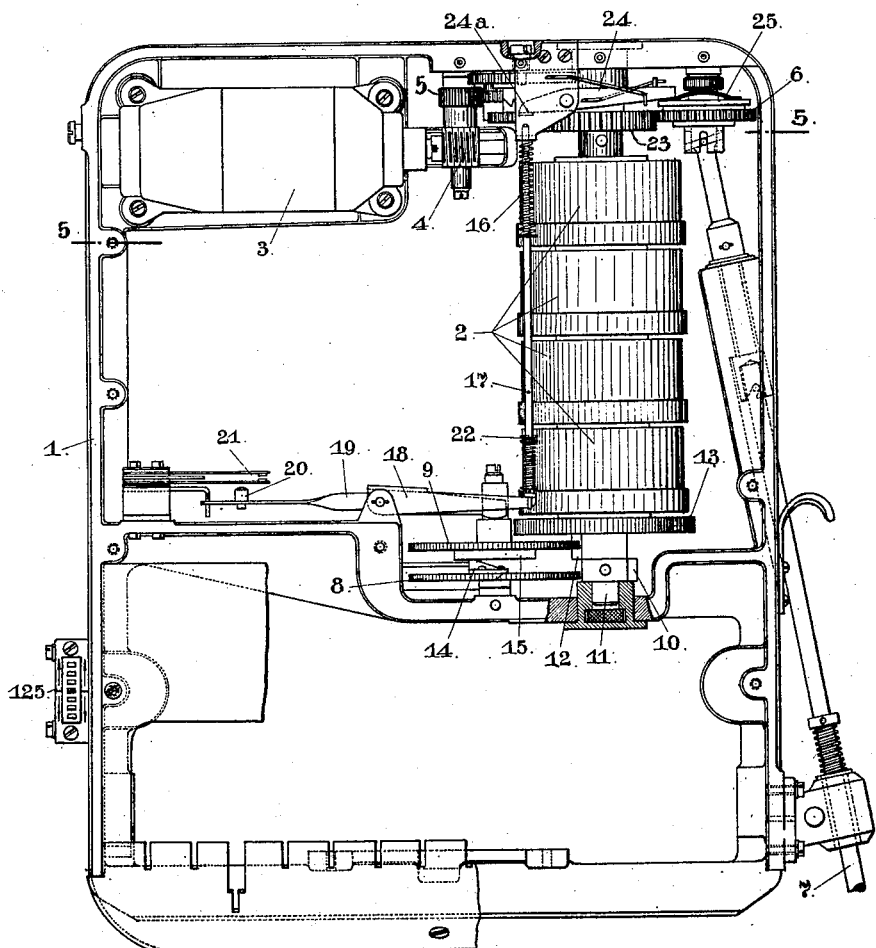
Fig. 4 shows the motor mechanism, with other parts removed, top view.

Figs. 4 and 5 of the attached drawings show the motor assembly, i. e., the electric and spring motors. The lower casting or base 1 supports the main-spring assembly 2 and an electric motor 3 for keeping the main-spring constantly wound-up by means of a worm-wheel transmission 4 and a gear-train 5, 23. A hand crank 7 of the gramophone type can be used to wind up the main-spring through the gear train 6, 23. The gear-train 5 consists of two wheels connected together by a ratchet.

*Mainspring control and signaling mechanism*

The base also supports an automatic device which switches the electric motor on and off for winding up the main spring, gives a signal when there is no current in the mains supply to the motor and shows that the spring should be wound up by hand. It also gives a signal shortly before the main-spring is unwound; at the same time it locks the apparatus without disturbing its adjustment and applies a brake shortly before the mainspring is fully wound-up thus preventing it from being snapped.

This automatic device consists of two gearwheels, 8 and 9; the first, 8, is turned round by an amount equal to one tooth by the dog 10 attached to the winding axle 11 of the spring drums 2, the other wheel, 9, being turned through one tooth by the dog 12 attached to the gear wheel 13 of the last power spring 2. Gear wheel 8 has a projection 14 and gear-wheel 9 a ring 15 with two steps in its end surface as will be seen from Fig. 6 which shows a development of the ring 15 and projection 14.

The spring drums 2 are mounted so that the first of them situated nearest to gearwheel 23 is rigidly attached to axle 11, while the second drum is free to rotate about axle 11 and has a collar, not shown in the drawings, which enters into the first drum and engages the inner end of the spiral spring inside the first drum. The outer end of this spring engages the drum. The other springs are similarly connected to their drums at their outer end and at their inner end to a collar affixed to the next drum, so that all drums are connected in tandem. The inner end of the fourth spring is coupled to a collar or gearwheel 13.

Figure 6:
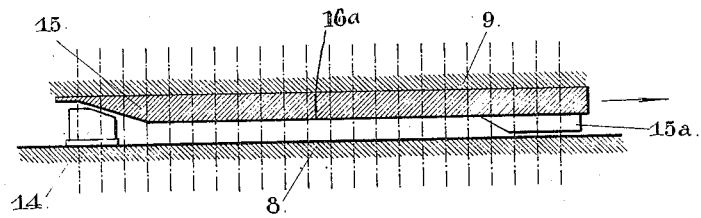
Fig. 6 is a development of the end surface of the ring and flange of parts of the motor mechanism.

When spring 2 is unwinding, transmitting its energy through gear-wheel 13 to the axle 26 of the apparatus (not shown in these two figures—see Fig. 7) the dog 12 on the gear wheel 13 is in engagement with gear-wheel 9 and turns it for each revolution of gear 13 through the pitch distance of one of the twenty-one teeth on its periphery, so that gear wheel 19 makes $\frac{1}{21}$ revolution for each revolution of gear 13 (see dotted lines on Figure 6). The end-surface of ring 15 on gear wheel 9 slips on the flat surface of projection 14 on gear-wheel 8 (Fig. 6). Shortly before the main-spring 2 is completely unwound, the step on ring 15 will be opposite the projection 14, and gear-wheel 9 (see Fig. 4) will be forced to move along the axle nearer to gear-wheel 8 by means of a lever 18 (Fig. 4) actuated by a rod 17 pressed upon by a spring 16, one end of which is forced against a fixed support. At the same time lever 18 makes lever 19 close a contact 21 by means of its insulated extension 20. Contact 21 switches on the electric motor 3 which commences to wind up spring 2 through the gear train 4, 5, 23 (Fig. 5).

If there be no current in the service supply to the motor, then the main spring 2, after unwinding one more revolution, will turn gear wheel 9 through one more division and thus force the bevelled step of the ring 15 to slide further onto the projection 14 (Fig. 6). As a result gearwheel 9 is forced still nearer to gearwheel 8 and in doing so actuates a bell, not shown in the drawings, thus indicating that the spring should be wound up by hand.

Should the operator be absent at this moment or pay no attention to it then the spring 2 will unwind one revolution more, the gearwheel 9 will come flush up against the gearwheel 8 (as shown in Fig. 6) the rod 17 (Fig. 5) will occupy its extreme position and by means of the disc 22 will stop the apparatus (as will be described later) so as to prevent the speed adjustment of the apparatus from being disturbed.

When the motor 3 begins to wind up the mainspring 2 after contact 21 has been closed, or when the spring is being wound up by hand, the gearwheel 13 attached to the axle 11, at each of its revolutions will turn gearwheel 8 through one tooth by means of the dog 10. As a consequence the projection 14 on gearwheel 8 will force the ring 15 attached to gearwheel 9 away from it until it engages with the flat edge 16a of the ring. After turning round several more teeth and shortly before the mainspring is fully wound up, the projection 14 will engage the projection 15a on the ring forcing gearwheel 9 still further away. At the same time lever 18 (Fig. 4) will be actuated and will relieve the pressure on contact 21 due to lever 19, thus switching off the motor 3.

Should it happen that the insulation between the contacts 21 breaks down and the motor 3 continues to wind up the main-spring 2, or when winding up the spring manually, the operator does not "feel" that the main spring 2 is nearly fully wound up, then dog 10 on the axle 11 will turn the gear-wheel 8 round one more tooth, forcing projection 14 to move the gearwheel 9 still further away. As a result rod 17 will engage lever 24 at its end 24a (Fig. 4), the opposite end of lever 24 applying a frictional brake 25. After this, the operator will find it far too difficult to wind up the apparatus any further, while with the electric motor, the load applied by the brake will be so large that the motor fuses will burn out. This action prevents the mainspring from being damaged since there are still reserve turns left in the spring.

*Power transmission and limiting mechanism*

The rotation of gearwheel 13 is transmitted to the axle 26 (Fig. 8) through a train of gearwheels 28, 27 and 38. The two gearwheels, 27 and 38 (Fig. 7) serve at the same time as a power limiting device.

This transmission is supported at one end on the vertical member 29. On the front side of this member is the mechanism actuating the keyboard, to be described later.

The power limiting device mentioned above fulfills the following purpose: The mainspring 2 is the primary source of energy actuating the apparatus and when it is nearly unwound must still be able to drive the moving parts at the necessary speed. Again, when the mainspring is fully wound up, its power is much larger than that required by the apparatus with the result that the stopping of the apparatus or the movements of the printing levers will be too powerful. This will be even more so while the mainspring 2 is being wound up as an external source of power is being applied. This limiting device has been introduced to prevent the occurrence of such a state of affairs. It absorbs all the excess power applied and keeps the operating torque constant, no matter what the tension of the mainspring 2 may be.

This limiting device consists of a gearwheel 27 mounted on the hub of a gearwheel 28 freely rotating on axle 30 (Fig. 9). A ring 31 is rigidly attached to the hub of gearwheel 28. A movable yoke 32 engages gearwheel 27 whose hub has a finger 34 (Fig. 11) attached to it. This finger 34 passes through a slot 35 in ring 31 (Fig. 13). This slot allows the finger 34 to turn through an angle of 60°.

A spring 33 (Fig. 9) is attached at one end to the ring 31 and at the other to the yoke 32 engaging the gearwheel 27.

On rotating the yoke 32 we can wind up the spring 33 until sufficient force is applied to cause the moving parts of the apparatus to rotate at the proper speed. Spring 33 is wound up to the necessary tension in the following manner. The yoke 32 is pulled away to the right from gearwheel 27 so that the finger $32^1$ leaves the hole $32''$. The yoke is rotated through the necessary angle and then released so that the finger $32^1$ passes through another hole $32''$ thus locking the yoke 32 in place. When the gearwheel 28 rotates (see Figs. 7, 8 and 9) under power transmitted through the train of gears from the spring 2, the gearwheel 27 will follow it at the same speed if the force applied to 28 is equal to that necessary for the apparatus to function at the proper speed. Should it happen, however, for the reasons mentioned above that the force applied to the gearwheel 28 be more than that necessary, then the gearwheel 28 will advance with respect to gearwheel 27 and will wind-up the spring 33 (Figs. 8 and 9). The finger 34 (Fig. 11) on the hub of the gearwheel 27 will turn with respect to the gearwheel 28 and straighten out the internal-expanding arcuate member 36 of the brake 37 (Figs. 9 and 10) attached to the axle of the driver gearwheel 28 and will apply a braking force to it, thus absorbing the excess power applied.

This type of regulator differs from all others in that it does not absorb power when the power applied and the operating power required are equal. It acts in this case as a simple transmission element transmitting rotation to the axle 26 through the medium of the gearwheel 38.

The main shaft 26 (Fig. 8) makes one complete revolution for each operating cycle. A buffer spring 39 connecting gearwheel 38 to the axle 26 takes up the shock when the moving parts of the apparatus are stopped after each cycle of operations.

A gearwheel 40 is rigidly coupled to the gearwheel 38 and transmits its rotation to a gearwheel 41 of equal diameter. This latter gearwheel 41 rewinds the spring 42 of the transmitting-receiving device, by one turn for each operating cycle of the apparatus. The gearwheel 41 is rigidly fixed to a hub which terminates in a knob 43. By moving this knob in an axial direction it is possible to unmesh gears 41 and 40. At the same time a friction brake prevents the hub of cogwheel 41 from rotating freely.

Figure 16:
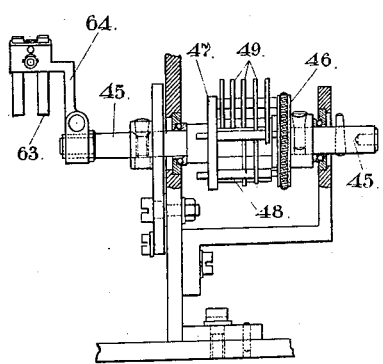

The spring 42 is attached at one end to the sleeve 44, the other end being attached to the hub of cogwheel 41. Sleeve 44 is coupled to the axle 45 of the transmitting-receiving device shown on Fig. 16. The spring 42 can be wound up to the proper tension necessary for operating the transmitting-receiving device by pulling out and turning knob 43 after which the gears 40 and 41 are again enmeshed by depressing knob 43. After each cycle of operations, the spring 42 is rewound to the proper tension by the power-shaft 26 of the apparatus.

Transmitting-receiving device

As was mentioned above, the transmitting and receiving devices in the proposed invention are combined into one mechanically complete unit (Figs. 15, 16 and 17), differing in this respect from all other types of start-stop apparatus, in which the transmitting and receiving devices are separate mechanical units. In these latter apparatus the beginning and end of the receiving cycle do not coincide with those of the transmitter because of the character of the stop-signal correction. The receiving device must remain stationary during part of this signal so that it may, in the following part of the cycle, be exactly in synchronism with the transmitted impulses.

The operating cycle of a start-stop apparatus using a five-element code, consists of seven impulses; the start impulse, five combination impulses and one stop-impulse. The first six impulses are equal in duration, while the seventh may be more prolonged.

The selector drum of the receiving device

In the receiving device it is necessary that when the selector drum is rotating uniformly, the selector fingers be so distributed on the circumference of the drum that each of them is acted upon by the receiver electromagnet armature when the latter is, at the mid-point of its motion, effected by a received impulse. In view of this, the first selector pin must be placed at an angular distance from the start-position of the drum equal to that through which the drum will turn, commencing from the start impulse to the middle of the first combination impulse. The fifth selector pin corresponding to the fifth combination impulse must be situated at the same distance from the stop position but in a direction opposite to the direction in which the drum rotates, i. e., at an angular distance from the stop position equal to the angle through which the drum rotates from the middle of the fifth combination impulse to the middle of the stop impulse.

Hence it will be seen that the selector drum must make one complete revolution in the time between the beginning of the start-impulse and the middle of the stop-impulse.

Should the receiving device (the selector drum) be so coupled to the driving mechanism that it begins rotating only some time after the reception of the start-impulse, it is obvious that the speed of rotation of this drum must be raised by an amount permitting it to complete one full revolution by the middle of the stop-signal impulse. In consequence the first selector pin must also be situated nearer to the stop position so that it acts at the middle of the first combination impulse.

To ensure stability of operation of the apparatus, it is necessary to arrange the receiving device so that it will always react correctly even when the speeds of the two inter-working apparatus differ by the maximum possible amount.

The appearance of a phase difference between the receiving device of one apparatus and the transmitting device of the other, commences only after the moment the receiving device begins rotating. Consequently, the greater the difference in time from the moment the start-impulse is received to the moment the receiver selector begins operating, or in other words, the greater the time lag of the receiving device, the less time will be left in the remainder of the operating cycle for the appearance of a phase difference in the operation of these two apparatus, when they are working at different speeds. The maximum time lag is thus seen to approach 1.5 transmission impulses.

A considerable time lag has been deliberately introduced in the proposed apparatus for the above-mentioned reason. Furthermore, it is possible to regulate the time lag and keep it constant at any predetermined amount during all the time the apparatus is working. This possibility makes it unnecessary to introduce any special device for regulating the phasing of the receiver device.

The receiving part of the combined transmitting-receiving unit in the proposed invention consists of a selector drum comprising two discs, 46, 47 (Figs. 18 and 19) serving as guides for the five selector pins designated by the number 48. These pins are distributed around the circumference of the drum, the latter being attached to axle 45 which is rotated by sleeve 44.

Each pin 48 has a finger 49 (Fig. 20). All the ends of the fingers are directed radially away from the axis of the drum and are situated so that their ends lie along a line on the surface of the drum, parallel to its axis (Figs. 16, 18, 19 and 20). Each finger has a hole drilled through it, through which passes a guide pin 50 (Fig. 20) fastened between the two discs 46 and 47, so that when the pins are moved axially, the fingers 49 are also moved axially along a line parallel to the axis of the drum independently of each other (Figs. 18, 19 and 20). The lever 51 of the receiver electromagnet 52 (Fig. 15) moves the pins 48 to their operating position when the latter are passing the inclined, bevelled surface $a$ of the lever 51 (Figs. 24, 25). The ends of the pins 48 coacting with this lever have an inclined surface (Figs. 21, 22, 23) such, that when the pins are passing the bevelled surface of the lever 51, both these surfaces (i. e., that of the lever and the pin) are parallel to each other.

In view of this peculiar characteristic of the proposed invention it is only when the edge $e$ of the bevelled surface $a$ of the armature 51 (Figs. 24, 25) meets the edge $c$ of the surface $b$ of the pin 48, that the position of the armature will determine whether the pin will be actuated or not, independently of the direction in which the armature is moving, i. e., to or from the magnet. Should the edge $e$ of the bevelled surface of the armature at this moment be lower than the upper edge $c$ of the pin 48, these two surfaces will coact until pin 48 is completely actuated. On the other hand, should the edge $e$ of the armature 51 be above the upper edge of the pin 48 at the moment these two surfaces meet, then the pin 48 will not be actuated even though the armature be attracted to the magnet. This takes place because of the fact that the armature lever 51 will slide along the upper edge $d$ of the passing pin 48.

In order that the selector functions properly, it is necessary that the armature lever 51 remain stationary while the receiving device turns through a certain angle. This angle we shall call the "operating angle."

The most modern start-stop telegraph apparatus have an operating angle of 12° to 18°, whereas in the proposed invention it has a value of not more than 3.5° even though the selector drum has a small diameter. This is possible because of the special form of the ends of the pins as described above and results in extreme exactitude and selectivity of the apparatus in operation.

Prior to coming into the region of operation of the bevelled surface *a* of the armature lever 51 (this surface *a* is nearer to the selector disc 47), the selector pins 48 at their other ends meet a fixed inclined surface at the side of the disc 46 at the point *f* (Fig. 15). The interaction of the fixed surface and the end of the pins 48 forces the latter into position for commencing the cycle of operations. In this way each selector pin 48 is definitely brought into the proper position prior to meeting the inclined surface *a* of the armature lever 51.

Figure 8:
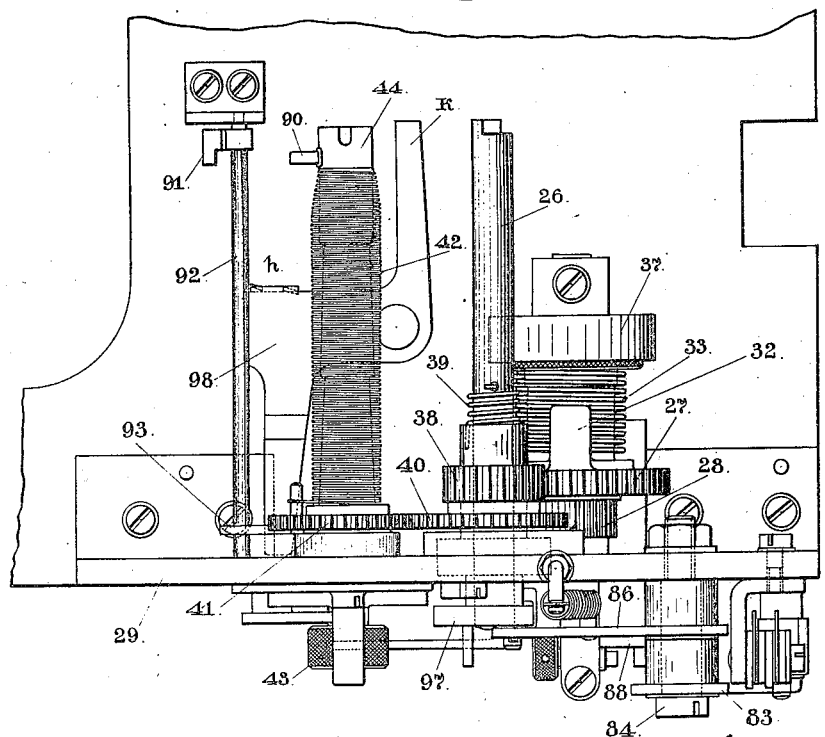

The disc 47 of the selector drum has a projection 53 (Fig. 19) on its circumference which serves to arrest the drum in the stop-position when it comes into contact with the stop-lever 54 (Fig. 15) after having completed one full revolution under the action of the spring 42 (Fig. 8).

Operation of receiving device

The operating cycle of the receiving device consists of the following steps.

Figure 45:
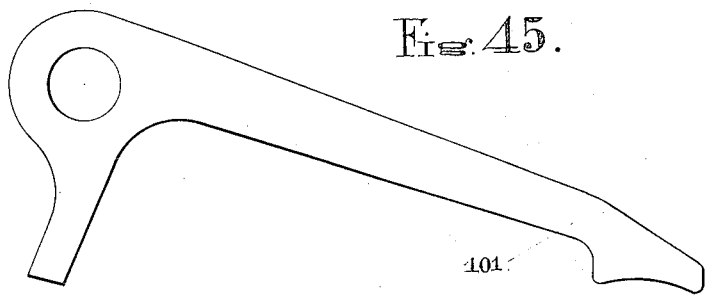
Fig. 45 shows the locking lever of the decoder sectors.

The start impulse releases the lever 51 attached to the armature of the receiver electromagnet 52 and it is lifted by its spring. The lever 51 meets the start-lever 55 (Fig. 15), lifts it, thus releasing the stop lever 54 after which the transmitter-receiver device axle 45 may rotate under the action of the spring 42 (Fig. 8) attached to it. During the revolution of the axle 45, each selector pin 48 in turn comes into the region of action of the bevelled surface *a* of the armature-lever 51 which is either attracted to the electromagnet or is released, according to the operating impulse received. After all the five operating impulses have formed the transmitted code combination by moving the pins 48 as a result of the operation of the electromagnet armature, and the fingers 49 have taken up positions corresponding to this combination, the selector drum turning further round will lift the lock levers of the decoding sectors (Figs. 40, 41, 45) by means of the actuated fingers 49, thus transmitting the received combination to the decoder. Just before the axle 45 completes a full revolution the pin 56 (Fig. 17) attached to the anchor cogwheel 57 affixed to the axle 45, will lift the lever 58. The latter will release the stop-lever 59 thus releasing the cam 60 affixed to the extension 26a of the power axle 26, thus allowing the latter to rewind the spring 42 to the proper tension by means of gearwheels 40, 41 (Fig. 8) and after each cycle of operations replenish the energy stored in the spring 42.

Uniform speed regulation

In the introduction to the specification, it was mentioned that a spring-driven, start-stop, telegraph apparatus in which the motion of the rotating part of the receiving device is not uniform, would be of no practical value at all.

The receiving-transmitting device of the proposed invention receives rotational energy not from a fixed speed, constantly rotating axle, but from a stationary spring. Hence the usual type of speed regulator is inapplicable here. At the same time, the typing, keyboard-resetting, case-changing operations, etc., do not require very exact synchronisation, and the synchronism preserved by the power-limiter device described above is quite sufficient for these purposes.

The use of any of the known types of frictional mechanical regulators for regulating the energy stored up in the main-spring 2 would cause a loss of 40-50% of its power. Hence the proposed invention involves the application of a speed regulator only for preserving synchronism of the axle of the transmitting-receiving device which is driven by a comparatively weak spring 42 (Fig. 8). As a result, the loss of energy due to the regulator is small compared with the energy used by the apparatus as a whole.

The speed regulator

The speed of the axle of the transmitting-receiving device must be uniform throughout the whole cycle. This requires that the speed regulator should be practically free from inertia, i. e., it should allow the axle to acquire the necessary speed practically instantaneously at the beginning of the cycle and at the end, to come to a stop immediately on receiving the stop impulse. A speed regulator having these properties comprises an anchor escapement-system having an anchor 61, an extension of which is furnished with a balance-weight 62 (Fig. 17). The fork 61 coacts with a cogwheel 57 having right-angled, saw-shaped teeth. The cogwheel 57 is rotated during the cycle by the unwinding of spring 42 through one turn, and forces the anchor-pendulum 61—62 to oscillate with a frequency several times greater than its natural frequency.

The operating curve of such a regulator is not linear. When the tension of the driver spring is increased 10% the speed of rotation is increased only 1-2% because of the action of the regulator. The speed of rotation of the transmitter-receiver axle can be regulated by suitably adjusting the tension of the spring 42 which has about 100 turns. Since the spring unwinds only one turn, the change in the tension of spring 42 is very small, so that the speed of rotation will, for all practical purposes, remain constant.

The speed of operation at any particular tension of spring 42 is measured by allowing the axle 45 to rotate freely (without stops) for some time. Each stop of the power shaft 26, 26a excites the vibrational speed indicator 125 (Fig. 1) whose indications are used to regulate the tension of the spring 42 by rotating the knob 43 (Fig. 8).

Since the number of revolutions per minute attained by the transmitter-receiver device without stops for correction is higher than the number of operating cycles per minute of the apparatus with stops for correction, the operation of other apparatus nearby will have no effect upon the readings of the speed indicator while adjusting the apparatus.

It is obvious that if the weight of the balance 62 (Fig. 17) on the anchor-pendulum be increased, a greater tension of the spring 42 will be required to give the same speed of axle 45 as that obtained with a lighter balance weight 62. Since the mass of the parts attached to the axle 45 of the transmitter-receiver device remains constant, a higher tension on spring 42 will cause axle 45 to achieve its proper speed in a shorter period of time. It will be seen that the angular lag of the transmitter-receiver axle can be adjusted to any value by suitably altering the weight 62.

Transmitter-receiver translator

The same axle 45 which actuates the selector drum of the receiver device, rotates the commutator brushes 63 (Fig. 16) of the transmitter. The brushes are fastened to a holder 64 (Fig. 16) and slide on the surface of a cylindrical commutator 65 (Fig. 28) and a contact ring 66.

This part is made in the form of an easily removable unit which is coupled to the electrical circuit of the apparatus by a plug contact.

Electrical circuits

Figure 30:
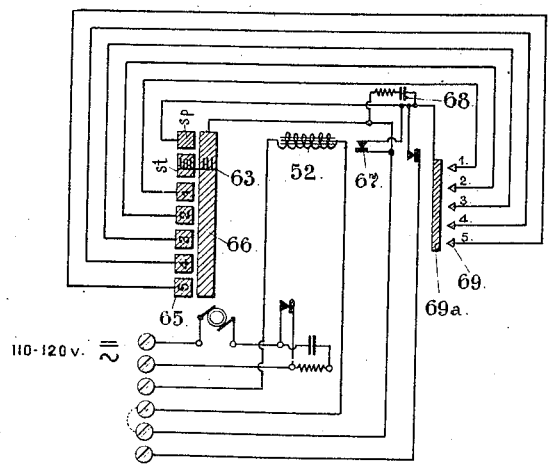
Fig. 30 is the electrical circuit diagram of the apparatus.

When the transmitting and receiving units are combined in one part, the circuit diagram is as shown in Fig. 30.

In the stop position, the commutator brush 63 is on the start contact indicated by the letters St. This contact is advanced in phase in the direction of rotation.

Figure 17:
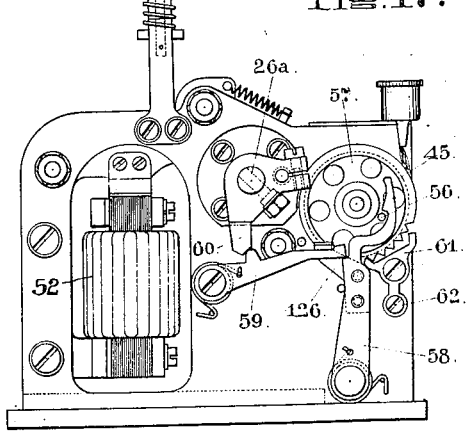

This is necessary so that when checking the apparatus on its own receiver, the selector pins will be operated at the proper moments, since the armature 51 of the electromagnet 52, Figs. 15, 17, 30, is attracted some moments after the commencement of the transmitted impulse. A contact 67 is installed to keep the armature 51 of the electromagnet 52 attracted to the magnet poles when the apparatus is not working. The electromagnet is constructed so that the time required by a current impulse to attract the armature is practically the same as that required by the armature to be drawn away when the current through the magnet coils is interrupted.

Consequently when the electromagnet is actuated by signals received from another apparatus, the delay incurred by the movement of the armature to or from the magnet will not alter the sequence of operations but will merely introduce a time delay equal to the operating time of the electromagnet armature. According to the proposed invention, use is made of this effect in transmitting with the apparatus.

The transmitting cycle

The transmitting cycle in the proposed invention is as follows:

On depressing any one of the keys, the normally closed contact 67 is opened by the mechanism described below and the start zero-current impulse is transmitted. In the following we shall call contact 67 the start contact.

The time lag of the armature of the electromagnet on leaving the electromagnet after the current has been stopped depends upon the self-inductance of the electromagnet and on the impedance of the resistance-capacity shunt 68. This time-lag prolongs the start impulse, which is still further prolonged by the angular lag of the transmitter-receiver axle and is concluded when the brush 63 has passed the commutator start segment St. The total length of time of the start impulse is so proportioned that it equals the length of a combination impulse. This may be achieved by adjusting the impedance of the resistance-capacity shunt 68 and the breadth of the start segment st.

Having passed the segment st, the brush consecutively passes the combination segments and on coming into contact with the stop segment SP, releases the contact 67 through a mechanism described below, thus closing the transmitter circuit and that of the receiver electromagnet 52 which is connected in series with the line.

Each of the segments of the commutator 65 (Figs. 27 and 30) is connected to one of the contacts 69 of the keyboard. These contacts are closed in accordance with the letter combination of the particular key depressed.

When making its revolution, the brush 63, through contact ring 66 of the commutator, sends impulses to the line through the coils of the electro-magnet 52 of its own receiver device. As a result, the transmitted impulses make the electromagnet lever 51 (Fig. 15) make up the transmitted combination on the receiver selector drum.

The keyboard

To make the action of the commutator and the operation of the mechanism opening and closing the start-contact 67 clear, it is necessary to explain the action of the keyboard (Figs. 31–36).

Each key of the keyboard is integral with the frame 70. The latter can only move vertically, being constrained by guide slots in the body of the apparatus. On the inner edges of each frame 70 are five projections, the arrangement of the projections corresponding to the five impulse code used in the particular embodiment of the proposed invention herein described. The five combination projections are integral with the frame 70, being formed by the same manufacturing operation.

Figure 33:
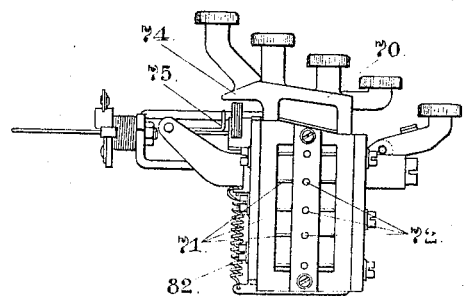
Figure 37:
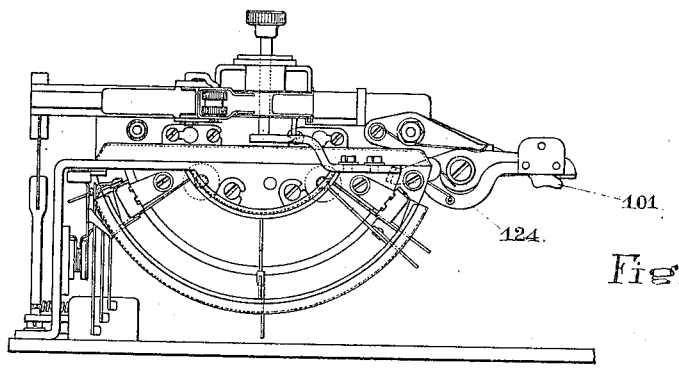
Figs. 37, 38, 39 show the decoding mechanism.
Figure 38:
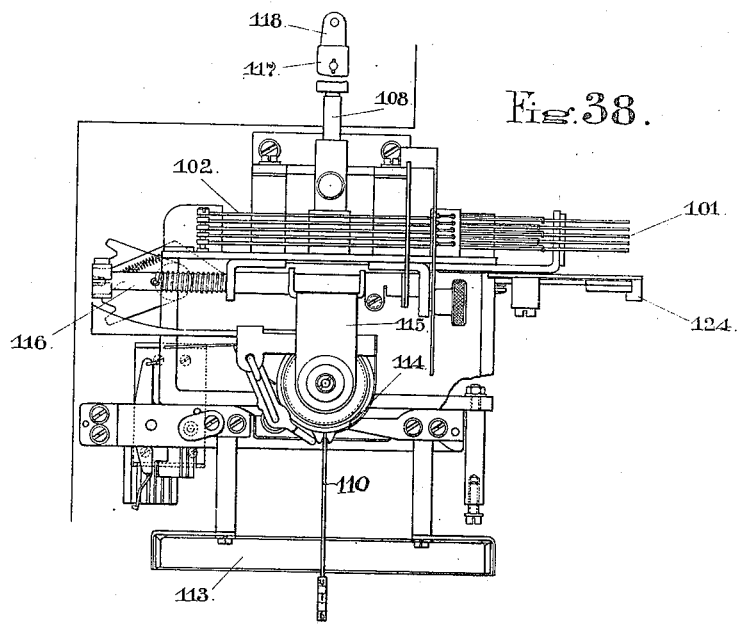

Each frame 70 is arranged vertically, all the frames in the keyboard being parallel to each other. Passing through all the frames are five horizontal combination strips 71, which can turn about their pivots 72 (Fig. 33). The strips are placed one above the other in one vertical plane through the middle of the frames 70 so that each strip is located midway between each set of projections. The strips are supported between centre-pivots and their transverse angular movement is not limited so that they may take up any position.

The projections on each frame 70 are cut away to correspond to the particular combination of impulses of the letter or sign designated on the key (this is shown by the dotted lines drawn on one of the frames illustrated) (Fig. 34). Each frame, consequently, differs from all the others in the key board.

When one particular key is depressed it turns all the five combination strips 70 through definite angles fixed by the combination peculiar to this key. As a result, the other keys cannot be depressed until the key manipulated is released, nor can two or more keys be depressed simultaneously.

Figure 32:
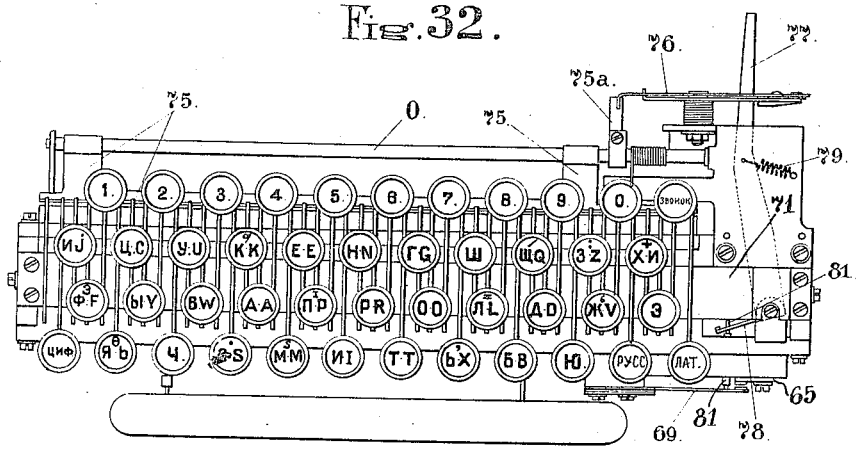

Each frame 70 has a projection 74 engaging the start strip 75 (Fig. 33) when the key is depressed. The strip 75 extends under all the projections 74 of the whole key board (Figs. 32, 33 and 34). The start-strip 75 presses on the start lever 76 (Figs. 32, 36) by means of its finger 75a. In its turn, the lever 76 releases the lever 77 (Fig. 32) of the catch 78 actuated by the spring 79. The latter tends to place the catch 78 into position so that its projections 80 (Figs. 35, 36) will hold the strips 71 in the position they take up when depressed by the key being manipulated.

Extensions of the contact pins 81 of the keyboard contacts 69 are situated within the space between the projections of the catch 78. These contact pins are free to move in a horizontal plane. Certain of these pins will not be held by the ends of the combination strips 71 and when the catch 78 moves under tension of the spring

Figure 31:
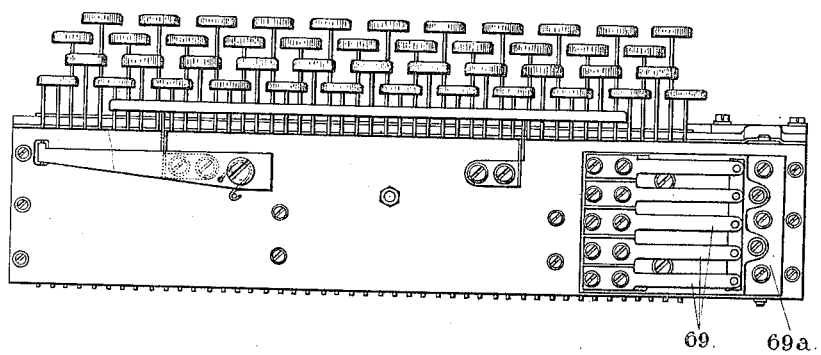
Figs. 31, 32, 33 show the keyboard.

79, these free extensions will close the spring contacts 69 by pressing against them. In this way the corresponding sector of the transmitter commutator 65 are connected to the common contact strip 69a (Figs. 30, 31, 36). When the contact brush 63 (Figs. 16, 30) reaches this segment it will transmit a signal impulse.

The contact pins 81 (Figs. 34, 35, 36), whose ends are held by the ends of the combination strips 71 will not allow the springs 69 to come into contact with the strips 69a when the catch 78 is actuated by its spring 79.

*Restoring means for catch for contact pins, and for key frames*

Figure 7:
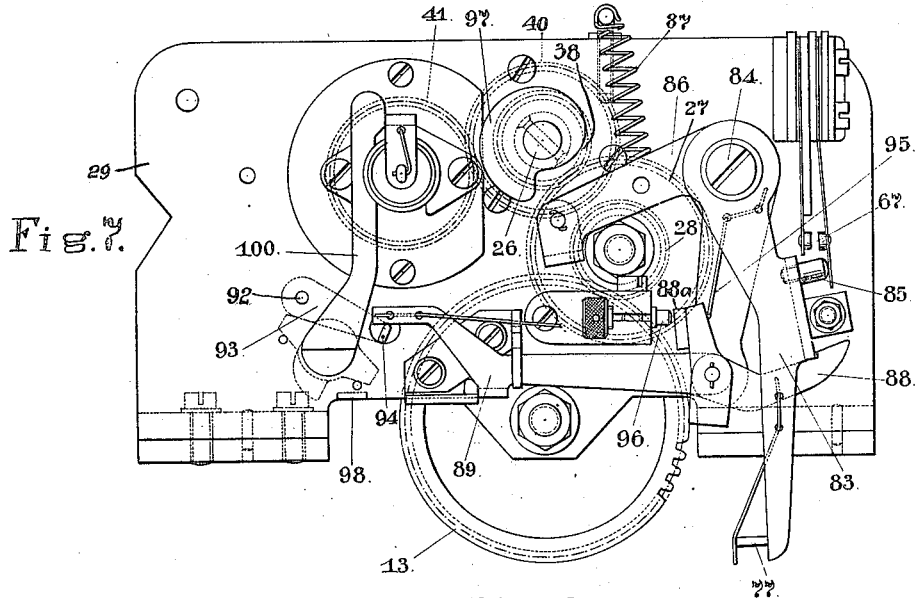
Figs. 7 and 8 show side and top views of the front support with the attached parts.

The frame 70 can be released immediately after being depressed. It is returned to its initial position by the spring 82, Fig. 33. Since the strips 71 are locked by the catch 78, this will prevent the depression of any other key until the catch 78 and lever 77 are returned to their initial positions. This movement is effected by levers situated on the front support 29 of the apparatus (Figs. 7 and 8).

Lever 83 which rotates freely about its pivot 84 is coupled to the lever 77 of the catch 78. When a key is depressed, the lever 77 under the action of spring 79 pulls lever 83 to the right (Fig. 7). The insulated finger 85 on the lever 83 opens the start contact 67 (Figs. 7 and 30).

The angular-shaped lever 86 (Fig. 7), pivoted on the same axle 84 as the lever 83, under tension from the spring 87 tends to return lever 83 to its initial position by means of the pawl 88. It is prevented from doing so by the lock 89 until the transmitter-receiver axle 45 has nearly completed one full revolution. When the brush 63 reaches the stop segment *sp* of the commutator, a projection 90 on the sleeve 44 (Fig. 8) will depress the arm 91 of the spindle 92. The finger 94 on the crank 93 attached to the spindle 92 will lift the lock 89, releasing the lever 86 the lower arm of which will return the lever 83 to its initial position by means of the pawl 88. At the same time, lever 83, being coupled to the lever 77, will return the catch 78 (Fig. 35) to its initial position and thus release the combination strips 71 of the keyboard so that any one of keys may be again depressed.

The spring 95 (Fig. 7) tends to press the pawl 88 towards the flange of the lever 83. After the lock 89 is released and the spring 87 causes the lever 86, by means of pawl 88, to return the lever 83 and the frame catch 78 to their initial positions, an extension of the pawl 88 comes into contact with a stop screw 96 and will be deflected, thus releasing the lever 83 from the pawl. This action is necessary so that when another key is manipulated, lever 77 of the catch 78 (Fig. 35) may be again depressed and the whole cycle be repeated. A cam 97 (Figs. 7, 8) on the power axle 26 returns the lever 86 to its initial position as shown in Fig. 7 after it has performed its operating cycle.

*Power locking mechanism*

Figure 46:
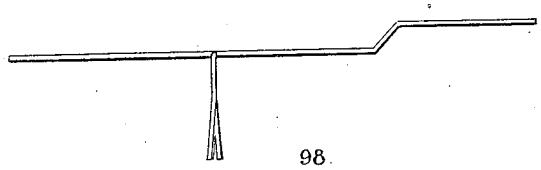
Figs. 46-48 show the three-armed locking lever of the apparatus.
Figure 47:
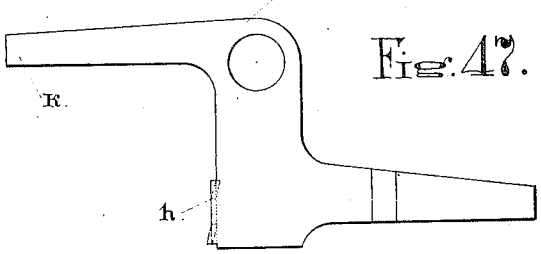
Figure 48:
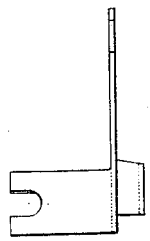

The arm K of the three armed lever 98, shown separately on Figs. 46–48, when turned in a direction from right to left, will act against the lower arm of lever 99 (Fig. 15) and make the upper arm of 99 arrest the movement of the finger 90 (Fig. 8) of the sleeve 44 and lock the apparatus. This results when the disc 22 on rod 17 (Fig. 4) of the automatic power spring rewind coacts with the arm *h* of the lever 98, when the mainspring 2 has been unwound a definite amount, and has not been rewound again after the rewind signal has been given.

Should it be desired to lock the apparatus at any other time so as to preserve the energy of the mainspring 2 or when the speed of the apparatus is being adjusted, the lever 100 (Fig. 7) is turned to the left by hand. When the lever 100 is in the right-hand position it prevents the gear-wheels 40 and 41 from being unmeshed.

*Decoding mechanism*

The printing arm corresponding to the signal combination received by the selector drum is actuated in the following manner: as was stated above, the fingers 49 of the selector drum transmit the received combination to the decoding device at the end of each revolution. The fingers 49 coact with the locking levers 101 (Figs. 37, 38, 40, 41, 45) of the sectors 102 shown in dotted outline in Fig. 40 and separately in Fig. 42. These sectors on their outer arc have recesses corresponding to the code combinations.

Figure 42:
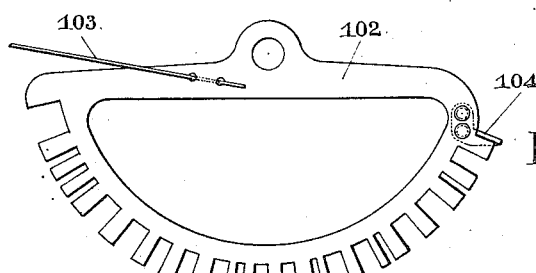
Fig. 42 shows one of the decoding sectors.

These sectors are acted upon by springs 103 (Figs. 40 and 42) tending to rotate them, but are prevented from doing so by the lock-levers 101 (Figs. 40, 45) which bear against the projections 104 on the sectors 102 (Fig. 42).

Figure 39:
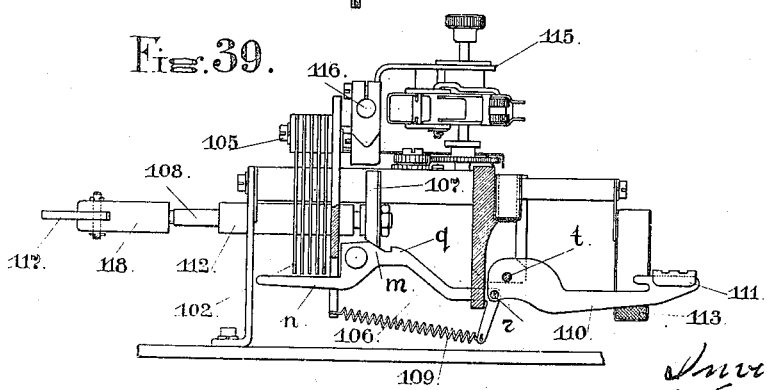

When the selector pins release the levers 101, the sectors corresponding to the selector pin combination, turn about their axle 105 (Figs. 39, 40) so that the recesses on their periphery form an uninterrupted groove whose position depends upon the particular impulse combination received.

Thrust levers 106 (Figs. 38, 39) are radially disposed along the arc of the sectors 102 and rest with their bevelled central section *m* upon the printing collar 107 mounted on the rod 108. This rod can be moved axially.

The end *n* of the thrust lever 106 which is opposite the clear groove formed by the recesses in the decoder sectors passes into it and by means of spring 109 places its projection *q* in a position to be caught by the printing collar 107 when moving axially. As a result the lever 106 moves forward and the printing arm 110 which is coupled to the thrust lever 106 at the point *r*, turns about the axle *t*, moves upwards and prints a letter with the type bar 111 attached to its end. The number of printing levers in the apparatus corresponds to the number of letters or signs in one case. Each printing arm is coupled to its own thrust lever 106.

The disposition of the thrust levers 106 adopted in the proposed invention makes it possible to use a short rod 108, reduce the length of its guide 112 and at the same time reduces the diameter and the weight of the printing collar 107, prevents it being misaligned and uses a minimum amount of energy for the printing operation.

The type bars 111 on the printing arms on their way to the paper tape meet an inking roller not shown in the drawings, receive a layer of ink from it, and, diverting it aside, make an impression on the tape, and return to rest on the cushion 113 under the action of the spring ·109 during the return movement of the printing collar 107, which by an ordinary lever mechanism, at the same time moves the paper tape forward.

The tape-pulling roller 114 (Figs. 38, 39) in its support 115 can be moved upwards or downwards on the axle 116 thus positioning the paper to receive the impression of the sign (of which there are 3 belonging to three cases on each bar) corresponding to the required case. The change of case (from letters to numerals, for instance) is effected by one of three special thrust levers 106, passing through a corresponding clear groove formed by the recesses on the decoder sectors. Instead of being coupled to printing arms, these three case thrust levers turn the carriage 115 of the axle 116 through the proper angle by means of levers.

The rod 108 of the printing collar is moved by means of a coupling 117 (Figs. 38, 39, 41) and a link 118 through a lever 119 (Figs. 43, 44) and coupling rod 120 actuated by a cam-like crank pin 60 fixed to the power shaft 26.

The spring 121 (Fig. 43), which fixes the speed of motion of the printing collar 107—and, hence, the strength of the printing arm impact, can be adjusted to the proper tension by the collar 122. It assists the power shaft 26a in the printing operation and is wound up on the return movement, thus weakening the impact at the moment the stop position is reached.

Figure 40:
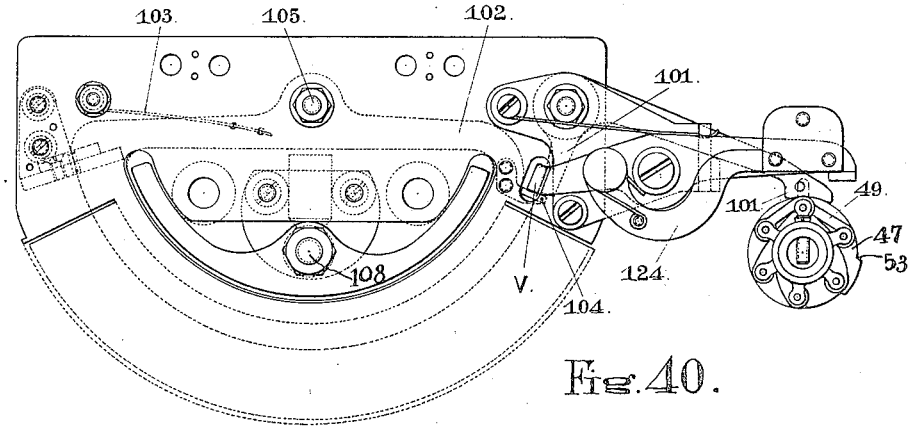
Figs. 40, 41 show part of the decoder on a larger scale.
Figure 41:
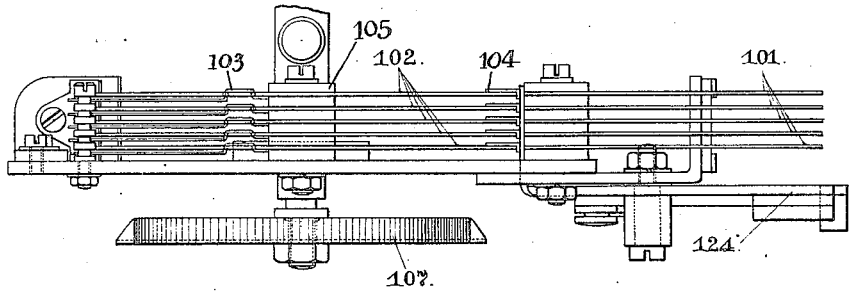

At the end of the return movement of the collar 107 (Fig. 39) the thrust levers 106 will be pressed away from the sectors 102 by the action of the printing collar 107 upon the bevelled edge m (Fig. 39) of the levers, and cam 123 (Fig. 15), keyed to axle 26a will return the sectors 102 to their initial position (Fig. 40) by means of the flanged part v of the lever 124 (Fig. 40).

The printing operation and the rewinding of the spring 42 take place immediately after the combination received by the selector drum has been passed on to the decoding mechanism. However, a new signal combination can be received at the same time as the printing and rewinding operations take place as they do not interfere.

The operation of the apparatus does not require exact synchronisation except as regards the axle of the receiver-transmitter unit, and in practice it may take place during the period up-to the reception of the second or third signal of the following cycle. However if the duration of these operations (i. e., those not including the operation of the receiver-transmitter unit) be extended to that of a whole cycle, this will not cause any errors in operation. Because the time lag of the receiver axle and of the action of the receiver-magnet armature is stable, the whole apparatus works with a stability equal to that of motor driven apparatus with the best types of speed governor.

All operating units in the apparatus are suspended on pivots instead of moving in grooves, thus making the operation of the apparatus at any temperatures quite dependable.

The method of case-changing, effected by moving the paper tape carriage, the effective protection of the decoder from paper dust due to the special form of the printing arms and the fact that the latter are horizontal when at rest, make it possible to transform the apparatus to printing on a wide paper band without changing the operating units.

The shape of the locking levers 58—59 precludes the possibility of the spring 42 being unwound more than one extra turn should the power shaft 26, 26a or the gear trains coupled to it be caught or should the spring 42 not be rewound at the proper moment. As a result, the possibility of the adjustment of the apparatus being disturbed and having to be readjusted is excluded.

The lever 58 (Fig. 17) has an angle 126 rigidly attached to it. When the pin 56 deflects the lever 58, the lever 59 permits the cam 60 to turn. When the cam 60 turns and releases the lever 59, the latter is pulled by a return spring upwards and allows the lever 58 to return to its initial position. At the same time, the projection on the lever 59 will come into a position preventing any further movement of the angle 126.

All the mechanical work in the apparatus is performed by the rotation of the shaft 26, 26a.

During these operations the axle 45 can receive a new series of combination impulses, but should it happen that it finish its cycle before the cam 60 makes one complete revolution and, hence, before the spring 42 is rewound and before the lever 59 is pressed down into contact with the flat surface of lever 58 (i. e., before it is pressed out of contact with the angle 126), the pin 56 will be unable to deflect the lever 58 and the unwinding of the spring 42 will be prevented.

The use of a power limiting device in the proposed apparatus has still another advantage in that any accidental stoppage of any working part will not cause any breakage or deformation of other parts, because the power at the mainshaft 26, 26a is quite small and insufficient to cause any damage.

I claim:

1. A type-printing, start-stop telegraph apparatus for operating on a multi-signal code, comprising a common work shaft, a receiving and transmitting device constituting a single unit mounted on said work shaft, a spring for rotating said work shaft during each working cycle, speed-regulating means of small weight for maintaining the rotational speed of said work shaft substantially constant during the working cycle, said receiving device being adapted to operate and the work shaft being adapted to rotate through its working cycle upon the passage thereto of transmission impulses, means for introducing an angular delay in the commencement of the rotation of said shaft following the initial impulse, and for determining the magnitude of that delay, a manually rewound spring motor, and means for energizing said first-mentioned spring from said motor following each working cycle.

2. A type-printing, start-stop telegraph apparatus for operating on a multi-signal code and including type-printing means, comprising a common work shaft, a receiving device and a transmitting device forming a single unit and disposed on said work shaft; a spring for driving said work shaft at a substantially uniform speed through a single working cycle, a manually rewindable spring motor, means for rewinding said first-mentioned spring from said spring motor at the conclusion of each working cycle, means for coupling said spring motor to the type-printing means only during the operation of the latter, means for limiting the extent to which the spring motor can be unwound, and stop means for holding the parts of the apparatus in readiness to operate during the rest position of the latter.

3. A type-printing, start-stop telegraph apparatus for operating on a multi-signal code, comprising a spring motor and a power shaft driven by said motor and a power regulator disposed between said spring motor and power shaft for regulating the power supplied by the spring motor and operable at all speeds, the said regulator comprising a pair of cogwheels rotatable relative to each other, a regulating spring coupling said cogwheels together so that one cog wheel rotates relative to the other under the influence of forces exceeding the resisting torque of said regulating spring, and a friction brake contacting with one said cogwheel and absorbing excess power, the said friction brake rotating as an unit with the two said cogwheels without energy absorption when the power supply equals the power demand.

4. A keyboard for use in a type-printing, start-stop telegraph apparatus for operating on a multi-signal code, comprising approximately rectangular shaped vertically disposed keyframes, teeth disposed in different code combinations on the inner vertical edges of said key frames, the teeth being disposed in rows through the various key frames, strips passing longitudinally, one through each row of teeth, and being free to turn on horizontal pivots, a catch turning about an axle when the key is depressed and having detents serving to retain or lock the strips in the position which they acquire upon actuation of any key, contact plungers movably mounted on the catch and lodging, after the catch is turned, against the edges of said strips, and electrical contacts cooperating with and closed by said plungers in code combinations, and serving to send combinational current impulses through a telegraph line with which said apparatus is associated.

5. A keyboard comprising approximately rectangular shaped vertically disposed keyframes, teeth disposed in different code combinations on the inner vertical edges of said key frames, the teeth being disposed in rows through the various key frames, strips passing longitudinally, one through each row of teeth, and being free to turn on horizontal pivots, a catch turning about an axle when any key is depressed and having detents serving to retain or lock the strips in the position which they acquire upon actuation of any key, contact plungers movably mounted on the catch and lodging, after the catch is turned, against the edges of said strips, and electrical contacts cooperating with and closed by said plungers in code combinations, and serving to send combinational current impulses through a telegraph line with which said apparatus is associated.

6. A unitary receiving-transmitting device forming part of a type-printing, start-stop telegraph apparatus adapted for operation on a multi-signal code, which unitary device is mounted on a common work shaft and has a spring motor for driving the same, the said transmitting device comprising a fixed commutator, having a start contact, a number of operating contacts equal to the number of signals in the code, and a stop contact and a rotatable system of contact brushes sliding over and contacting with said commutator, impulses being transmitted through said commutator by said contact brushes in accordance with a particular code combination, and said transmitting device comprises a selector drum, a number of selector pins equal to the number of signals in the code disposed about the periphery of said selector drum and movable axially thereof, fingers on said pins disposed in a line along the surface and parallel to the axis thereof, decoding segments actuated by said fingers upon displacement of said pins responsive to a received code combination, means for moving said pins responsive to a received code combination, and means cooperating with said selector pins upon rotation of the latter therepast, and serving to return the selector pins to their rest position before the start of another working cycle.

7. Type-printing start-stop telegraph apparatus for operation on a multi-signal code, comprising a low-power manually rewindable spring drive, a work-shaft, a transmitting device and a receiving device rigidly mounted on said work-shaft and operable as a single unit, means for rotating said work-shaft at constant speed through the working cycle, a start-stop-device common to both devices on said work-shaft, a second spring driving said start-stop device and operable periodically, means for rewinding said last-mentioned spring from said spring drive, and means employing the electrical phase lag and the degree of mechanical lag of the unitary transmitting device and receiving device for ensuring the necessary duration of a starting impulse for the apparatus.

8. A receiving device for a type-printing, start-stop telegraph apparatus for operation on a multi-signal code and including a decoding device, comprising a selector drum, selectors pins disposed equidistantly about the periphery of said drum and movable axially therein, fingers on said pins disposed along a line on the surface of said drum and actuating said decoding device, a receiver electromagnet energized by impulses transmitted by a related transmitting device, and an armature forming part of said electromagnet and having a bevelled end face forming a plane surface and coacting with said pins and displacing them actually of said drums in response to the received impulses, and the cooperating ends of the selector pins being complementarily bevelled so that each selector pin is moved axially only when the bevelled end of the pin and the plane at the end of the electromagnetic armature.

LEONID TREML.